United States Patent
Kato et al.

(10) Patent No.: US 11,878,690 B2
(45) Date of Patent: Jan. 23, 2024

(54) VEHICLE CONTROL DEVICE

(71) Applicant: ADVICS CO., LTD., Kariya (JP)

(72) Inventors: Hiroyuki Kato, Kariya (JP); Yosuke Hashimoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 191 days.

(21) Appl. No.: 17/439,618

(22) PCT Filed: Mar. 11, 2020

(86) PCT No.: PCT/JP2020/010545
§ 371 (c)(1),
(2) Date: Sep. 15, 2021

(87) PCT Pub. No.: WO2020/203121
PCT Pub. Date: Oct. 8, 2020

(65) Prior Publication Data
US 2022/0153271 A1    May 19, 2022

(30) Foreign Application Priority Data
Mar. 29, 2019   (JP) ................................ 2019-065367

(51) Int. Cl.
*B60W 30/18* (2012.01)
*B60W 50/10* (2012.01)

(52) U.S. Cl.
CPC ...... *B60W 30/18109* (2013.01); *B60W 50/10* (2013.01); *B60W 2510/0638* (2013.01)

(58) Field of Classification Search
CPC .......... B60W 30/18109; B60W 50/10; B60W 2510/0638; B60W 30/18027;
(Continued)

(56) References Cited

U.S. PATENT DOCUMENTS

| | | | |
|---|---|---|---|
| 5,657,229 A * | 8/1997 | Naito | ...................... B60T 8/175 188/DIG. 1 |
| 2002/0036429 A1* | 3/2002 | Shimada | ................... B60L 7/26 903/947 |

(Continued)

FOREIGN PATENT DOCUMENTS

| | | | | |
|---|---|---|---|---|
| DE | 102010064138 A1 * | 9/2011 | ................ | B60T 7/12 |
| JP | 2008001288 A | 1/2008 | | |

(Continued)

OTHER PUBLICATIONS

International Search Report (PCT/ISA/210) with translation and Written Opinion (PCT/ISA/237) dated Jun. 16, 2020, by the Japan Patent Office as the International Searching Authority for International Application No. PCT/JP2020/010545. (10 pages).

*Primary Examiner* — B M M Hannan
(74) *Attorney, Agent, or Firm* — BUCHANAN INGERSOLL & ROONEY PC (57) ABSTRACT

A start control device, which is a control device, includes: a first adjustment processing unit configured to execute a first adjustment process of instructing at least one of a brake device and a drive device to increase a braking/driving force when the braking/driving force is negative and the vehicle is stopped; and a second adjustment processing unit configured to start a second adjustment process of instructing at least one of the brake device and the drive device to increase the braking/driving force at a speed lower than an increasing speed of the braking/driving force before end of the first adjustment process on condition that the braking/driving force has become greater than or equal to a determination braking/driving force by the increase in the braking/driving force accompanying the execution of the first adjustment process.

12 Claims, 4 Drawing Sheets

(58) Field of Classification Search
CPC ....... B60W 30/18118; B60W 2520/04; B60W 2520/10; B60W 10/18; B60W 10/04; B60T 7/12
USPC .......................................................... 701/70
See application file for complete search history.

(56) References Cited

U.S. PATENT DOCUMENTS

| | | | |
|---|---|---|---|
| 2008/0221766 A1* | 9/2008 | Maeda .................. | B60T 8/1755 |
| | | | 701/70 |
| 2010/0004844 A1* | 1/2010 | Hirooka ................ | F02P 5/1506 |
| | | | 701/102 |
| 2015/0105948 A1* | 4/2015 | Chang .................... | B60L 15/20 |
| | | | 701/22 |
| 2016/0304068 A1* | 10/2016 | Monzaki ................. | B60T 8/171 |
| 2019/0263368 A1* | 8/2019 | Takahashi ....... | B60W 30/18145 |
| 2019/0283733 A1* | 9/2019 | Takei ................. | B60G 17/0195 |
| 2020/0189535 A1* | 6/2020 | Okamoto .................. | B60T 8/17 |

FOREIGN PATENT DOCUMENTS

| | | | | | |
|---|---|---|---|---|---|
| JP | 2009062846 A | | 3/2009 | | |
| JP | 2009062897 A | * | 3/2009 | | |
| JP | 2010221917 A | | 10/2010 | | |
| JP | 2014054945 A | * | 3/2014 | .......... | B60W 10/115 |
| JP | 2020117065 A | * | 8/2020 | ............ | B60T 13/741 |
| WO | WO-2015152224 A1 | * | 10/2015 | .............. | B60T 7/042 |
| WO | WO-2016002685 A1 | * | 1/2016 | ................ | B60T 1/10 |

* cited by examiner

VEHICLE CONTROL DEVICE

TECHNICAL FIELD

The present disclosure relates to a vehicle control device that starts a vehicle by controlling a brake device and a drive device of the vehicle.

BACKGROUND ART

Patent Literature 1 describes an example of a vehicle control device that starts a vehicle by controlling a brake device and a drive device of the vehicle. In this control device, when an accelerator operation is performed by the driver while the vehicle is stopped by application of a braking force, the braking force is decreased and a driving force is increased. When the driving force exceeds the braking force, the vehicle starts.

CITATIONS LIST

Patent Literature

Patent Literature 1: JP 2009-62846 A

SUMMARY

Technical Problems

When starting the vehicle by increasing the driving force while decreasing the braking force of the vehicle, the vehicle may be suddenly accelerated depending on a decrease mode of the braking force and an increase mode of the driving force immediately after the start, and an occupant of the vehicle may feel discomfort.

Solutions to Problems

A vehicle control device for solving the above problem is a device that starts a vehicle by controlling a brake device and a drive device. The control device includes a first adjustment processing unit configured to execute a first adjustment process of instructing at least one of a brake device and a drive device to increase a braking/driving force when the braking/driving force is negative and the vehicle is stopped, in a case where a force that becomes negative when the braking force of the vehicle exceeds the driving force of the vehicle and becomes positive when the braking force of the vehicle falls below the driving force of the vehicle is defined as the braking/driving force; and a second adjustment processing unit configured to start a second adjustment process of instructing at least one of the brake device and the drive device to increase the braking/driving force at a speed lower than an increasing speed of the braking/driving force before end of the first adjustment process on condition that the braking/driving force has becomes greater than or equal to a determination braking/driving force smaller than "0 (zero)" due to an increase in the braking/driving force accompanying the execution of the first adjustment process.

According to the above configuration, when the first adjustment process is executed while the vehicle is stopped by the application of the braking force, at least one of the brake device and the drive device is driven by the instruction of the first adjustment process, and the braking/driving force is increased. When the braking/driving force is greater than or equal to the determination driving force, the first adjustment process is ended and the second adjustment process is started. When at least one of the brake device and the drive device is driven by the instruction of the second adjustment processing unit, the braking/driving force is increased at a speed lower than the increasing speed of the braking/driving force before the end of the first adjustment process. That is, the braking/driving force is increased at a relatively high speed before the start of the vehicle, and the braking/driving force is increased at a relatively low speed before and after the start of the vehicle. As a result, sudden acceleration of the vehicle at the time of starting can be suppressed while suppressing a start delay of the vehicle.

DESCRIPTION OF EMBODIMENT

Figure 1:
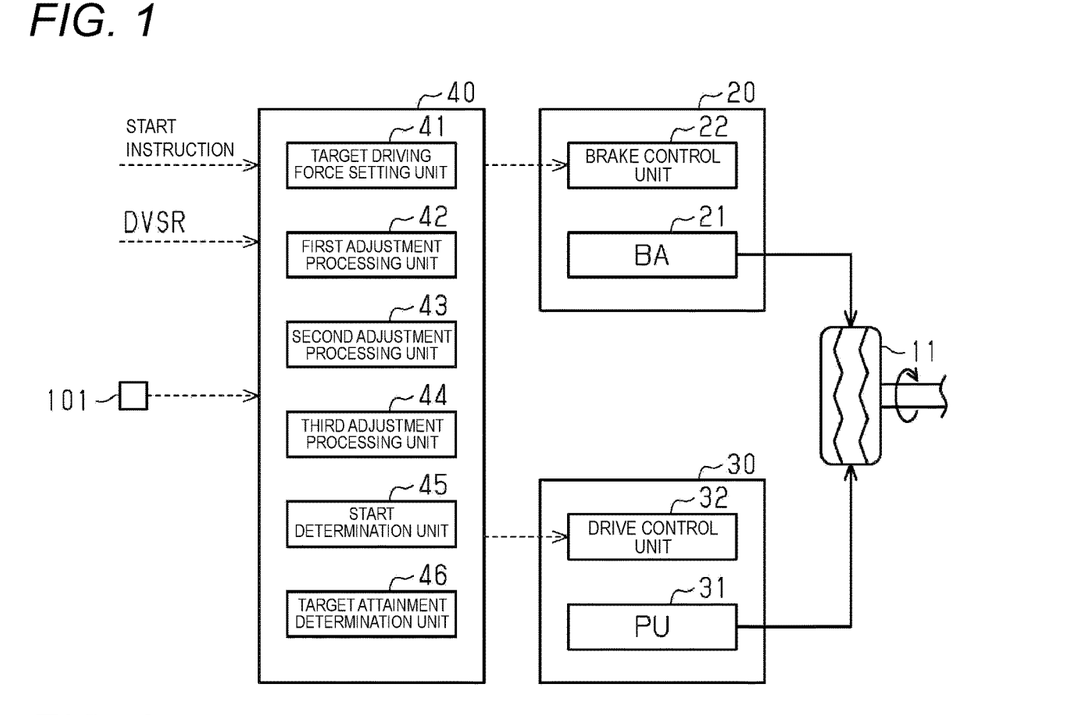
FIG. 1 is a block diagram illustrating a schematic configuration of a start control device, a brake device, and a drive device which are one embodiment of a vehicle control device.

Hereinafter, one embodiment of a vehicle control device will be described with reference to FIGS. 1 to 5A-5D. FIG. 1 illustrates a start control device 40, a brake device 20, and a drive device 30 which are examples of the control device of the present embodiment. The brake device 20 includes a braking actuator 21 and a braking control unit 22 that controls the braking actuator 21. The braking control unit 22 adjusts a braking force BP of the vehicle by controlling the braking actuator 21. The drive device 30 includes a power unit 31 and a drive control unit 32 that controls the power unit 31. The power unit 31 includes an engine as a power source of the vehicle. Then, the drive control unit 32 adjusts a driving force DP of the vehicle by controlling the power unit 31.

Various sensors are provided in the vehicle. Examples of the sensor include a wheel speed sensor 101. The wheel speed sensor 101 detects a wheel speed VW of a wheel 11 of the vehicle, and outputs a signal corresponding to the detected wheel speed VW to the start control device 40 as a detection signal. In the start control device 40, a vehicle body speed VS of the vehicle is derived on the basis of the wheel speed VW of the wheel 11 based on the detection signal from the wheel speed sensor 101. In addition, in the start control device 40, a value obtained by time-differentiating the vehicle body speed VS is derived as a vehicle body acceleration DVS of the vehicle.

Furthermore, a start instruction of the vehicle being stopped is input to the start control device 40 from another control device, and a required acceleration DVSR, which is a required value of the vehicle body acceleration of the vehicle, is input to the start control device from another control device. The start control device 40 includes, as functional units that control the brake device 20 and the drive device 30 when a start instruction of the vehicle is input, a target driving force setting unit 41, a first adjustment processing unit 42, a second adjustment processing unit 43, a third adjustment processing unit 44, a start determination unit 45, and a target attainment determination unit 46.

The target driving force setting unit 41 sets a target driving force DPS which is a target of the driving force of the vehicle. That is, the target driving force setting unit 41 sets a value corresponding to the required acceleration DVSR as the target driving force DPS. Therefore, the target driving force DPS increases as the required acceleration DVSR increases.

The first adjustment processing unit 42 executes a first adjustment process of instructing at least one of the brake device 20 and the drive device 30 to increase a braking/driving force BDP when the vehicle is stopped by the application of the braking force BP. The braking/driving force BDP is a force corresponding to the braking force BP and the driving force DP of the vehicle. For example, a value obtained by subtracting the braking force BP from the driving force DP is the braking/driving force BDP. Therefore, when the braking force BP exceeds the driving force DP, the braking/driving force BDP becomes negative, and when the braking force BP falls below the driving force DP, the braking/driving force BDP becomes positive. When the braking force BP is equal to the driving force DP, the braking/driving force BDP becomes "0 (zero)". The contents of the first adjustment process will be described later.

The second adjustment processing unit 43 starts a second adjustment process when a predetermined first start condition is satisfied. In the second adjustment process, the second adjustment processing unit 43 instructs at least one of the brake device 20 and the drive device 30 to increase the braking/driving force BDP at a speed lower than an increasing speed of the braking/driving force BDP before the end of the first adjustment process. The contents of the second adjustment process will be described later.

The third adjustment processing unit 44 starts a third adjustment process when a predetermined second start condition is satisfied. In the third adjustment process, the third adjustment processing unit 44 instructs one of the brake device 20 and the drive device 30 to increase the braking/driving force BDP at the same speed as the increasing speed of the braking/driving force BDP before the end of the second adjustment process. The contents of the third adjustment process will be described later.

The start determination unit 45 determines whether or not the vehicle has started using the detection signal from the wheel speed sensor 101. That is, when it is detected that the wheel 11 is rotating based on the transition of the detection signal, the start determination unit 45 determines that the vehicle has started. On the other hand, when it is not detected that the wheel 11 is rotating, the start determination unit 45 does not determine that the vehicle has started.

The target attainment determination unit 46 determines whether or not the braking force BP has reached a target value during the execution of the second adjustment process. That is, the target attainment determination unit 46 determines that the braking force BP has reached the target value when an instruction braking force BPTr, which is an instruction value of the braking force output from the start control device 40 to the braking control unit 22, becomes less than or equal to a target braking force BPS. In the present embodiment, "0 (zero)" is set as the target braking force BPS. Therefore, when the instruction braking force BPTr becomes less than or equal to the target braking force BPS, determination can be made that the braking of the vehicle is released.

Figure 2:
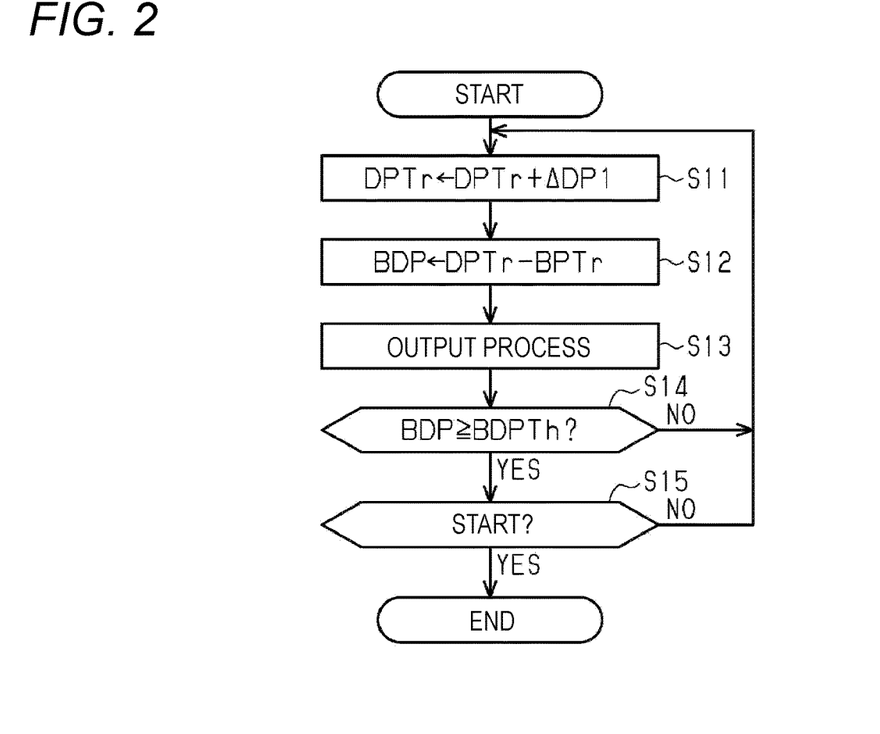
FIG. 2 is a flowchart describing a processing routine executed by a first adjustment processing unit of the start control device.

Next, a processing routine executed by the first adjustment processing unit 42 to execute the first adjustment process will be described with reference to FIG. 2. This processing routine is started on condition that a start instruction has been input to the start control device 40 under a situation where the vehicle is stopped.

In this processing routine, in step S11, the sum of an instruction driving force DPTr at the current time point and a first drive increase amount ΔDP1 is calculated as the latest instruction driving force DPTr. Subsequently, in step S12, a value obtained by subtracting the instruction braking force BPTr at the current time point from the latest instruction driving force DPTr is calculated as the braking/driving force BDP. Since the first adjustment process is started when the vehicle is stopped by the application of the braking force BP, the instruction braking force BPTr is larger than the instruction driving force DPTr at the start of the first adjustment process. That is, the braking/driving force BDP is negative at the start of the first adjustment process.

In the next step S13, an output process of inputting the latest instruction driving force DPTr to the drive control unit 32 and inputting the latest instruction braking force BPTr to the braking control unit 22 is executed.

When the instruction driving force DPTr is input by the execution of the output process, the drive control unit 32 controls the power unit 31 so that the driving force DP follows the instruction driving force DPTr. Therefore, when an instruction based on the execution of the first adjustment process is input to the drive control unit 32, the driving force DP is increased at a speed corresponding to the first drive increase amount ΔDP1. Furthermore, since the instruction braking force BPTr is held during the first adjustment process, the instruction braking force BPTr input to the braking control unit 22 does not change. That is, in the first adjustment process, the braking control unit 22 is instructed to hold the braking force BP. As a result, the braking control unit 22 controls the braking actuator 21 to hold the braking force BP at the instruction braking force BPTr. Therefore, during the first adjustment process, the braking/driving force BDP is increased at a speed corresponding to the first drive increase amount ΔDP1.

When the output process is executed, the process proceeds to the next step S14. In step S14, whether or not the braking/driving force BDP is greater than or equal to a determination braking/driving force BDPTh is determined. The determination braking/driving force BDPTh is a criterion for determining whether or not the vehicle is about to start, and is set to a value smaller than "0 (zero)". When the braking/driving force BDP is less than the determination braking/driving force BDPTh (S14: NO), the process proceeds to step S11 described above. That is, the first adjustment process is continued.

On the other hand, when the braking/driving force BDP is greater than or equal to the determination braking/driving force BDPTh (S14: YES), the process proceeds to the next step S15. In step S15, whether or not the vehicle has started is determined. That is, when the start determination unit 45 does not determine that the vehicle has started (S15: NO), the process proceeds to step S11 described above. That is, the first adjustment process is continued. On the other hand, when the start determination unit 45 determines that the vehicle has started (S15: YES), the first adjustment process is ended. Then, the present processing routine is terminated.

Figure 3:
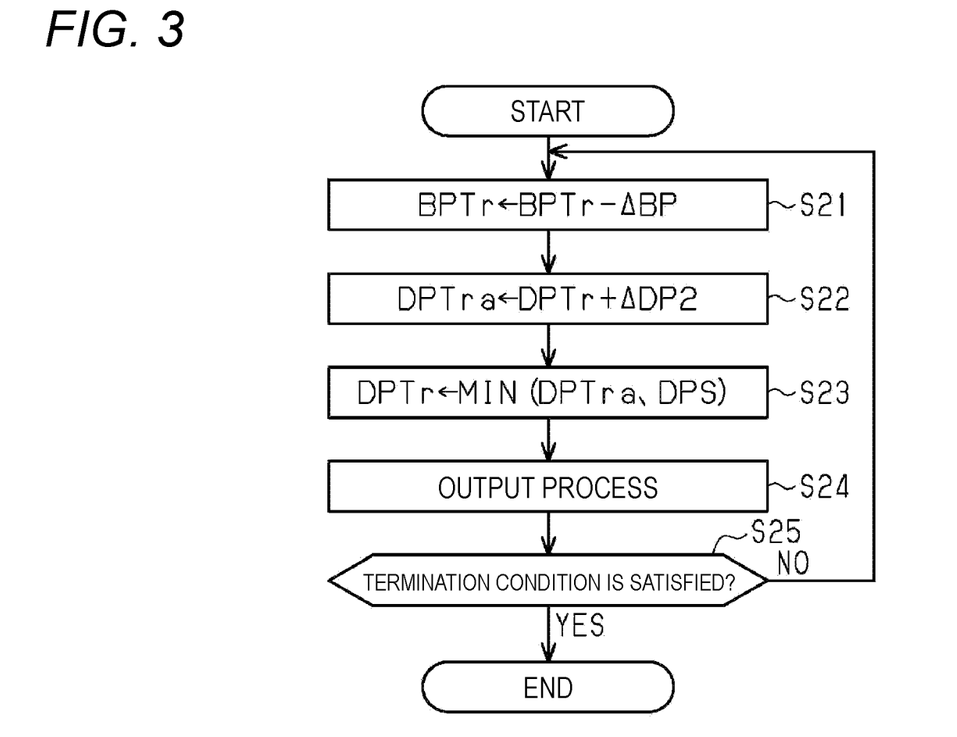
FIG. 3 is a flowchart describing a processing routine executed by a second adjustment processing unit of the start control device.

Next, a processing routine executed by the second adjustment processing unit 43 to execute the second adjustment process will be described with reference to FIG. 3. This processing routine is started on condition that the braking/ driving force BDP has become greater than or equal to the determination braking/driving force BDPTh by the execution of the first adjustment process and the start determination unit 45 has determined that the vehicle has started. That is, when both of the fact that the braking/driving force BDP becomes greater than or equal to the determination braking/driving force BDPTh by the execution of the first adjustment process and the fact that the start determination unit 45 determines that the vehicle has started are satisfied, determination can be made that the first start condition is satisfied.

In this processing routine, in step S21, a value obtained by subtracting a braking decrease amount ΔBP from the instruction braking force BPTr at the current time point is calculated as the latest instruction braking force BPTr. The braking decrease amount ΔBP is a positive value. Subsequently, in step S22, the sum of the instruction driving force DPTr at the current time point and a second drive increase amount ΔDP2 is calculated as a temporary value DPTra of the instruction driving force. The second drive increase amount ΔDP2 is a positive value and is smaller than the first drive increase amount ΔDP1. More specifically, the second drive increase amount ΔDP2 is set such that the sum of the second drive increase amount ΔDP2 and the braking decrease amount ΔBP is less than the first drive increase amount ΔDP1.

In step S23, the smaller one of the calculated temporary value DPTra of the instruction driving force and the target driving force DPS set by the target driving force setting unit 41 is set as the latest instruction driving force DPTr. Subsequently, in the next step S24, an output process of outputting the latest instruction driving force DPTr to the drive control unit 32 and outputting the latest instruction braking force BPTr to the braking control unit 22 is executed.

When the instruction driving force DPTr is input by the execution of the output process, the drive control unit 32 controls the power unit 31 so that the driving force DP follows the instruction driving force DPTr. Therefore, when an instruction based on the execution of the second adjustment process is input to the drive control unit 32, the driving force DP is increased at a speed corresponding to the second drive increase amount ΔDP2. Furthermore, when the instruction braking force BPTr is input by the execution of the output process, the braking control unit 22 controls the braking actuator 21 so that the braking force BP follows the instruction braking force BPTr. Therefore, when an instruction based on the execution of the second adjustment process is input to the braking control unit 22, the braking force BP is decreased at a speed corresponding to the braking decrease amount ΔBP.

When the output process is executed, the process proceeds to the next step S25. In step S25, determination is made on whether or not a termination condition of the second adjustment process is satisfied. In the present embodiment, when the target attainment determination unit 46 determines that the braking force BP has reached the target value, determination is made that the termination condition of the second adjustment process is satisfied. On the other hand, when the target attainment determination unit 46 does not determine that the braking force BP has reached the target value, determination is not made that the termination condition of the second adjustment process is satisfied. When determination is not made that the termination condition is satisfied (S25: NO), the process proceeds to step S21 described above. That is, the second adjustment process is continued. On the other hand, when determination is made that the termination condition is satisfied (S25: YES), the second adjustment process is ended. Then, the present processing routine is terminated.

As described above, the sum of the braking decrease amount ΔBP and the second drive increase amount ΔDP2 is smaller than the first drive increase amount ΔDPL. Therefore, during the second adjustment process, the increasing speed of the braking/driving force BDP is lower than that during the first adjustment process.

Figure 4:
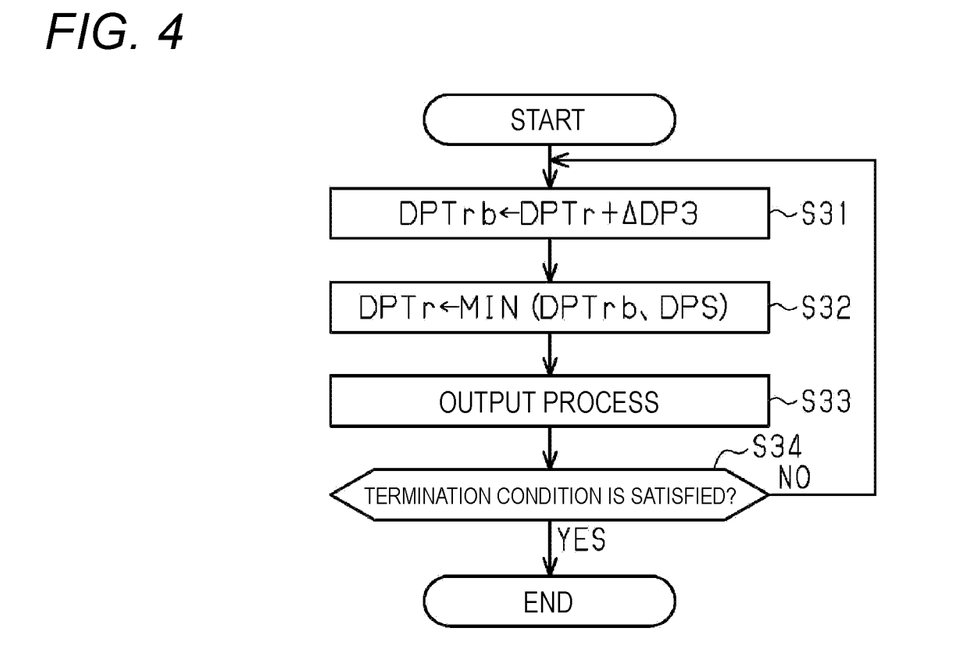
FIG. 4 is a flowchart describing a processing routine executed by a third adjustment processing unit of the start control device.
Figure 5A:
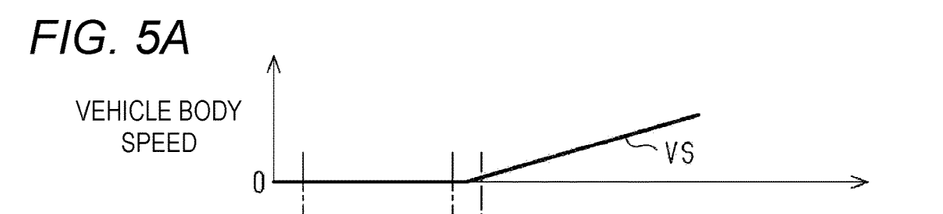
FIGS. 5A-5D are timing charts when starting a vehicle.
Figure 5B:
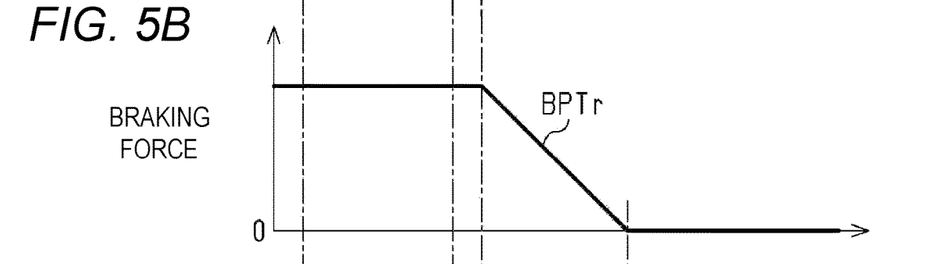
Figure 5C:
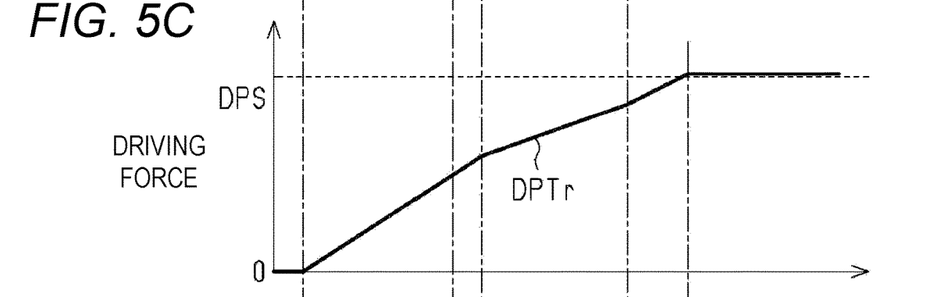
Figure 5D:
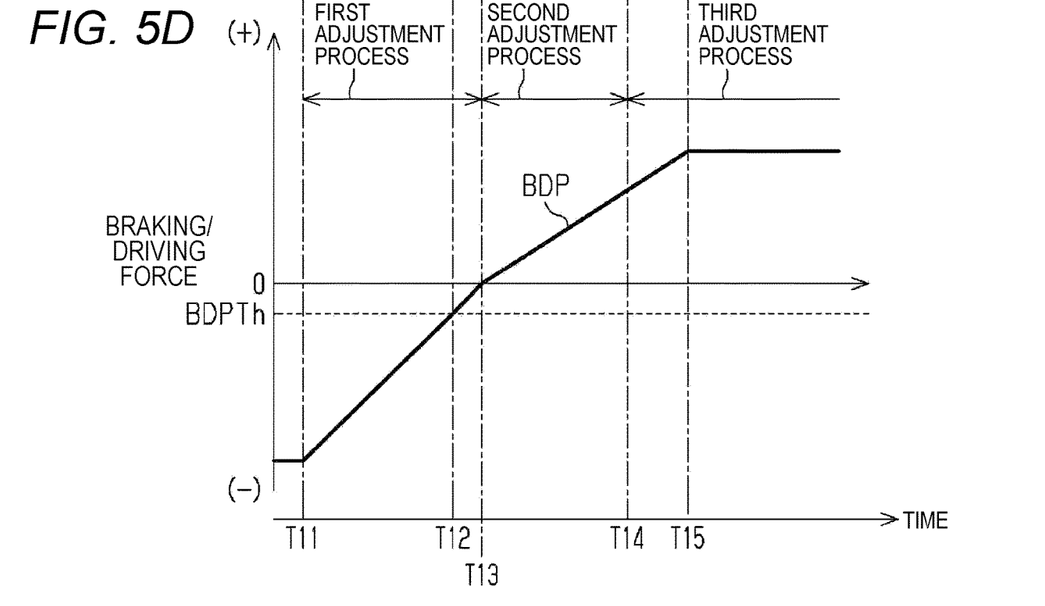
Figure 6A:
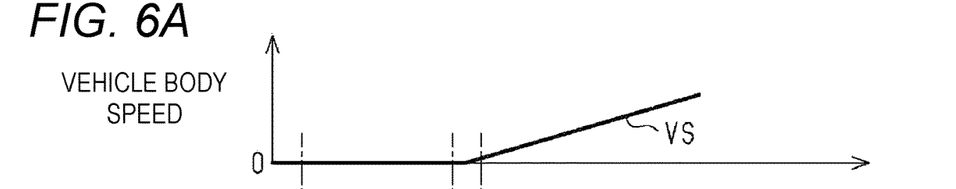
FIGS. 6A-6D are timing charts when starting a vehicle in a modified example.
Figure 6B:
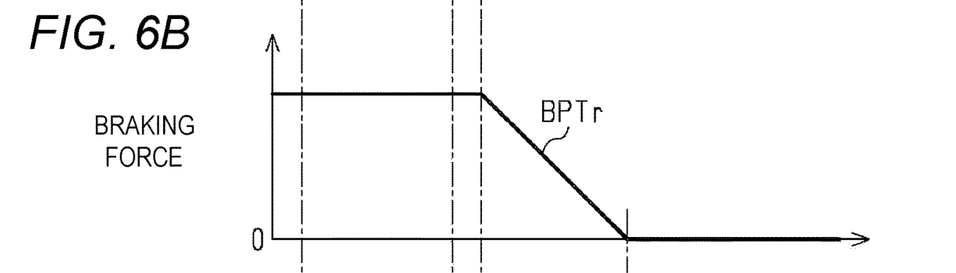
Figure 6C:
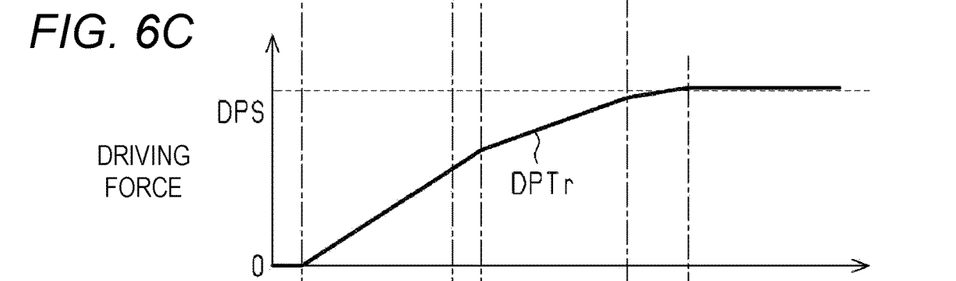
Figure 6D:
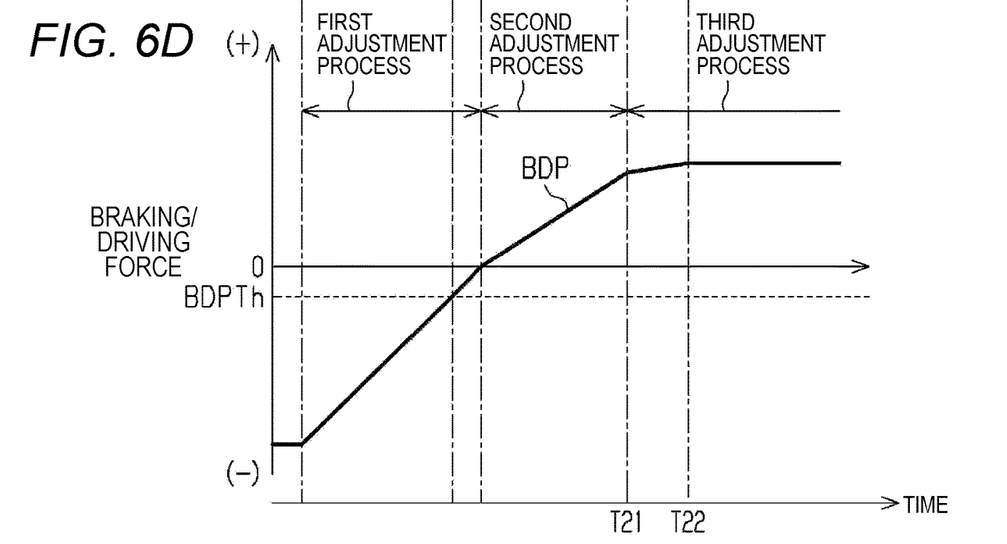

Next, a processing routine executed by the third adjustment processing unit 44 to execute the third adjustment processing will be described with reference to FIG. 4. This processing routine is started on condition that the target attainment determination unit 46 has determined that the braking force BP has reached the target value. That is, when the target attainment determination unit 46 determines that the braking force BP has reached the target value, determination can be made that the second start condition is satisfied.

In this processing routine, in step S31, the sum of the instruction driving force DPTr at the current time point and a third drive increase amount ΔDP3 is calculated as the temporary value DPTrb of the instruction driving force. The third drive increase amount ΔDP3 is a positive value and is larger than the second drive increase amount ΔDP2. Specifically, the third drive increase amount ΔDP3 is set such that the increasing speed of the braking/driving force BDP during the third adjustment process becomes the same as the increasing speed of the braking/driving force BDP during the second adjustment process. Subsequently, in step S32, the smaller one of the calculated temporary value DPTrb of the instruction driving force and the target driving force DPS set by the target driving force setting unit 41 is set as the latest instruction driving force DPTr. Then, in step S33, an output process of outputting the latest instruction driving force DPTr to the drive control unit 32 is executed.

When the instruction driving force DPTr is input by the execution of the output process, the drive control unit 32 controls the power unit 31 so that the driving force DP follows the instruction driving force DPTr. Therefore, when an instruction based on the execution of the third adjustment process is input to the drive control unit 32, the driving force DP is increased at a speed corresponding to the third drive increase amount ΔDP3.

When the output process is executed, the process proceeds to the next step S34. In step S34, determination is made on whether or not a termination condition of the third adjustment process is satisfied. For example, determination is made that the termination condition is satisfied when the vehicle body speed VS of the vehicle becomes higher than or equal to a determination vehicle body speed VSTh. On the other hand, when the vehicle body speed VS is less than the determination vehicle body speed VSTh, determination is not made that the termination condition has been satisfied.

When determination is not made that the termination condition is satisfied (S34: NO), the process proceeds to step S31 described above. That is, the third adjustment process is continued. On the other hand, when determination is made that the termination condition is satisfied (S34: YES), the third adjustment process is ended. Then, the present processing routine is terminated.

Next, the operation and effect of the present embodiment will be described with reference to FIGS. 5A-5D. As illustrated in FIGS. 5A, 5B, 5C and 5D, a start instruction is input to the start control device 40 at timing T11 when the vehicle is stopped by the application of the braking force BP. Then, the first adjustment processing is started. In the first adjustment process, the instruction driving force DPTr is increased at a speed corresponding to the first drive increase amount $\Delta DP1$ while the instruction braking force BPTr is held. Then, while the brake device 20 holds the braking force BP of the vehicle, the drive device 30 increases the driving force DP of the vehicle so as to follow the increase in the instruction driving force DPTr. As a result, the braking/driving force BDP of the vehicle can be increased at a speed corresponding to the first drive increase amount $\Delta DP1$.

Although the braking/driving force BDP becomes greater than or equal to the determination braking/driving force BDPTh at timing T12 during the execution of the first adjustment process, determination is not yet made that the vehicle has started at timing T12. Therefore, the first adjustment process is continued. That is, the increase in the braking/driving force BDP at the speed corresponding to the first drive increase amount $\Delta DP1$ is continued. Since determination is made that the vehicle has started at the subsequent timing T13, the first adjustment process is ended and the second adjustment process is started.

During the execution of the first adjustment process, the braking/driving force BDP is increased at a speed higher than that at the time of the execution of the second adjustment process. Therefore, as compared with a case where the increasing speed of the braking/driving force BDP during the execution of the first adjustment process is made equal to the increasing speed of the braking/driving force BDP during the execution of the second adjustment process, the time required from when the start instruction is input to the start control device 40 until the vehicle actually starts can be shortened.

Furthermore, a comparative example in which the braking force BP is decreased during the execution of the first adjustment process will be considered. In this comparative example, the braking force BP is decreased even in a state where divergence between the driving force DP and the target driving force DPS is large. Thus, for example, when the vehicle is stopped on a climbing road, sliding down of the vehicle may occur. On the other hand, in the present embodiment, the braking force BP is not decreased in the first adjustment process. Therefore, for example, even in a case where the vehicle is stopped on a climbing road, it can be suppressed that the sliding down of the vehicle occurs during the execution of the first adjustment process.

When the second adjustment process is started from timing T13, the instruction braking force BPTr is decreased at a speed corresponding to the braking decrease amount $\Delta BP$. In the second adjustment process, the instruction driving force DPTr is increased at a speed corresponding to the second drive increase amount $\Delta DP2$. At this time, the instruction braking force BPTr and the instruction driving force DPTr are changed such that the increasing speed of the braking/driving force BDP during the execution of the second adjustment process becomes lower than the increasing speed of the braking/driving force BDP before the end of the first adjustment process. Therefore, as compared with a case where the increasing speed of the braking/driving force BDP during the execution of the second adjustment process is made equal to the increasing speed of the braking/driving force BDP during the execution of the first adjustment process, sudden acceleration of the vehicle after the start can be suppressed. Therefore, in the present embodiment, sudden acceleration of the vehicle at the time of starting can be suppressed while suppressing a start delay of the vehicle.

Furthermore, in the second adjustment process, the braking force BP is decreased unlike during the execution of the first adjustment process. Therefore, the dragging feeling of the vehicle can be reduced as compared with a case where the holding of the braking force BP is continued even during the execution of the second adjustment process.

In the example illustrated in FIGS. 5A-5D, the instruction driving force DPTr does not become greater than or equal to the target driving force DPS during the execution of the second adjustment process. Therefore, the instruction driving force DPTr is not held during the execution of the second adjustment process. However, depending on the required acceleration DVSR, the instruction driving force DPTr may reach the target driving force DPS during the execution of the second adjustment process. In this case, after the instruction driving force DPTr has reached the target driving force DPS, the instruction driving force DPTr is not increased even during the execution of the second adjustment process, that is, the instruction driving force DPTr is held.

At timing T14 during the execution of the second adjustment process, the instruction braking force BPTr becomes the target braking force BPS (=0 (zero)), and determination is made that the braking force BP has reached the target value. Therefore, the second adjustment process is ended and the third adjustment process is started. Since the braking force BP cannot be further decreased during the execution of the third adjustment process, the instruction driving force DPTr is increased at a speed corresponding to the third drive increase amount $\Delta DP3$ larger than the second drive increase amount $\Delta DP2$.

Since the braking force BP is not decreased during the execution of the third adjustment process, when the instruction driving force DPTr is increased at a speed corresponding to the second drive increase amount $\Delta DP2$, the increasing speed of the braking/driving force BDP lowers by the transition from the second adjustment process to the third adjustment process. In this regard, during the execution of the third adjustment process in the present embodiment, the driving force DP is increased at a speed corresponding to the third drive increase amount $\Delta DP3$ larger than the second drive increase amount $\Delta DP2$. Thus, a change in the increasing speed of the braking/driving force BDP caused by the transition from the second adjustment process to the third adjustment process can be suppressed. As a result, a change in the acceleration of the vehicle caused by the transition from the second adjustment process to the third adjustment process can be suppressed.

In the example illustrated in FIGS. 5A-5D, the instruction driving force DPTr reaches the target driving force DPS at timing T15 during the execution of the third adjustment process. Therefore, after timing T15, the driving force DP and the braking/driving force BDP of the vehicle are held.

The present embodiment can be modified and implemented as follows. The present embodiment and the following modified examples can be implemented in combination with each other within a technically consistent scope.

In the above embodiment, the increasing speed of the braking/driving force BDP during the third adjustment process is made the same as the increasing speed of the braking/driving force BDP during the second adjustment process by making the third drive increase amount $\Delta DP3$ larger than the second drive increase amount $\Delta DP2$. However, the present disclosure is not limited thereto, and the increasing speed of the braking/driving force BDP during the third adjustment process need not be the same as the increasing speed of the braking/driving force BDP during the second adjustment process. For example, the increasing speed of the braking/driving force BDP during the third adjustment process may be made lower than the increasing speed of the braking/driving force BDP during the second adjustment process.

FIGS. 6A, 6B, 6C and 6D illustrate an example of a case where the increasing speed of the braking/driving force BDP during the third adjustment process is made lower than the increasing speed of the braking/driving force BDP during the second adjustment process. In this case, if the increasing speed of the braking/driving force BDP during the third adjustment process is lower than the increasing speed of the braking/driving force BDP during the second adjustment process, the third drive increase amount ΔDP3 may be less than the second drive increase amount ΔDP2, may be equal to the second drive increase amount ΔDP2, or may be larger than the second drive increase amount ΔDP2. In the example illustrated in FIGS. 6A-6D, the third drive increase amount ΔDP3 is less than the second drive increase amount ΔDP2.

At timing T21, whether the instruction braking force BPTr becomes the target braking force BPS (=0 (zero)) by the execution of the second adjustment process and the braking force BP reaches the target value are determined. Therefore, the second adjustment process is ended and the third adjustment process is started at timing T21. At this time, the increasing speed of the braking/driving force BDP after timing T21, that is, the increasing speed of the driving force DP becomes lower than the increasing speed of the braking/driving force BDP before timing T21. Since the instruction driving force DPTr reaches the target driving force DPS at timing T22 during the execution of the third adjustment process, the braking/driving force BDP is held after timing T22.

In the example illustrated in FIGS. 5A-5D, the increasing speed of the braking/driving force BDP does not decrease from the start of the second adjustment process until the braking/driving force BDP is held because the instruction driving force DPTr has reached the target driving force DPS. Therefore, the increasing speed of the braking/driving force BDP greatly changes before and after timing T15 when the holding of the braking/driving force BDP is started. As a result, the acceleration of the vehicle may greatly change before and after timing T15. On the other hand, in the example illustrated in FIGS. 6A-6D, the increasing speed of the braking/driving force BDP is once decreased from the start of the second adjustment process until the braking/driving force BDP is held because the instruction driving force DPTr has reached the target driving force DPS. Therefore, the change amount of the increasing speed of the braking/driving force BDP when the instruction driving force DPTr reaches the target driving force DPS can be made smaller than that in the case of the example illustrated in FIGS. 5A-5D. A great change in the acceleration of the vehicle can be suppressed by reducing the increasing speed of the braking/driving force BDP in a plurality of times as in the example illustrated in FIGS. 6A-6D.

If the increasing speed of the braking/driving force BDP during the execution of the first adjustment process can be made higher than the increasing speed of the braking/driving force BDP during the execution of the second adjustment process, the instruction braking force BPTr may be decreased in the first adjustment process. When decreasing the instruction braking force BPTr in the first adjustment process as described above, the instruction driving force DPTr may be varied or the instruction driving force DPTr may be held. However, when the occurrence of sliding down of the vehicle is predicted by the decrease of the braking force BP accompanying the execution of the first adjustment process, it is desirable not to decrease the instruction braking force BPTr in the first adjustment process.

If the increasing speed of the braking/driving force BDP during the execution of the second adjustment process can be made lower than the increasing speed of the braking/driving force BDP during the execution of the first adjustment process, the second drive increase amount ΔDP2 need not be made smaller than the first drive increase amount ΔDP1 in the second adjustment process.

When the target driving force DPS is small since the small road surface gradient θ is small, the instruction driving force DPTr may reach the target driving force DPS before the instruction braking force BPTr reaches the target braking force BPS during the execution of the second adjustment process. In such a case, when the instruction driving force DPTr has reached the target driving force DPS during the second adjustment process, determination can be made that the driving force DP has reached the target value, and hence determination may be made that the termination condition of the second adjustment process is satisfied, and the second adjustment process may be ended and the third adjustment process may be started. When the increasing speed of the braking/driving force BDP during the third adjustment process is the same as the increasing speed of the braking/driving force BDP during the second adjustment process, the decreasing speed of the instruction braking force BPTr in the third adjustment process is made higher than the decreasing speed of the instruction braking force BPTr in the second adjustment process.

When the increasing speed of the braking/driving force BDP during the third adjustment process is made lower than the increasing speed of the braking/driving force BDP during the second adjustment process as in the example illustrated in FIGS. 6A-6D, the decreasing speed of the instruction braking force BPTr in the third adjustment process is made lower than or equal to the decreasing speed of the instruction braking force BPTr in the second adjustment process.

In the above embodiment, when both of the fact that the braking/driving force BDP becomes greater than or equal to the determination braking/driving force BDPTh by the execution of the first adjustment process and the fact that the start determination unit 45 determines that the vehicle has started are satisfied, determination is made that the first start condition is satisfied, the first adjustment process is ended, and the second adjustment process is started. However, the first start condition may be a condition different from such a condition. For example, when the braking/driving force BDP becomes greater than or equal to the determination braking/driving force BDPTh by the execution of the first adjustment process before the start determination unit 45 determines that the vehicle has started, determination may be made that the first start condition is satisfied when the braking/driving force BDP becomes greater than or equal to the determination braking/driving force BDPTh, the first adjustment process may be ended, and the second adjustment process may be started. On the contrary, when the start determination unit 45 determines that the vehicle has started at a stage where the braking/driving force BDP is less than the determination braking/driving force BDPTh during the execution of the first adjustment process, determination may be made that the first start condition is satisfied based on the determination, the first adjustment process may be ended, and the second adjustment process may be started.

The start determination unit 45 may be omitted. In this case, the first adjustment process is ended and the second adjustment process is started when the braking/driving force BDP becomes greater than or equal to the determination braking/driving force BDPTh by the execution of the first adjustment processing unit regardless of whether or not the vehicle has started.

In the above embodiment, the determination braking/driving force BDPTh is fixed at a prescribed value, but the determination braking/driving force BDPTh may be varied. For example, if the gradient of the road surface on which the vehicle is stopped can be acquired, the determination braking/driving force BDPTh may be varied depending on whether the road surface is a climbing road, a downhill road, or a horizontal road. In addition, the determination braking/driving force BDPTh may be varied according to the gradient of the road surface.

In the above embodiment, the braking force BP becomes "0 (zero)" and the braking of the vehicle is released by setting the instruction braking force BPTr to "0 (zero)", and thus "0 (zero)" is set as the target braking force BPS. However, even if the instruction braking force BPTr is not decreased to "0 (zero)", the braking force BP of the vehicle can be decreased to a magnitude that does not substantially affect the acceleration of the vehicle. Therefore, if it can be assumed that the braking of the vehicle is released when the instruction braking force BPTr reaches the target braking force BPS, a value other than "0 (zero)" may be set as the target braking force BPS.

The power unit may include both an engine and an electric motor as a power source of the vehicle. The power unit may include only an electric motor as a power source of the vehicle.

Next, a technical idea that can be grasped from the above embodiment and the modified examples will be described.

(a) Preferably, a target driving force setting unit that sets a value corresponding to a required acceleration as a target driving force which is a target of the driving force of the vehicle when the vehicle body acceleration required for the vehicle is the required acceleration is provided, where
in the second adjustment process, the second adjustment processing unit instructs the drive device to increase the driving force when the driving force of the vehicle is less than the target driving force, and instructs the drive device to maintain the driving force when the driving force of the vehicle reaches the target driving force.

(b) Preferably, in the third adjustment process, the third adjustment processing unit instructs the drive device to increase the driving force when the driving force of the vehicle is less than the target driving force, and instructs the drive device to maintain the driving force when the driving force of the vehicle reaches the target driving force.

The invention claimed is:

1. A vehicle control device that starts a vehicle by controlling a brake device and a drive device; the vehicle control device comprising:
   in a case where a force that becomes negative when a braking force of the vehicle exceeds a driving force of the vehicle and becomes positive when the braking force of the vehicle falls below the driving force of the vehicle is defined as a braking-driving force,
   a first adjustment processing unit configured to execute a first adjustment process of instructing to increase the braking-driving force by increasing the driving force to be instructed to the driving device without reducing the braking force to be instructed to the braking device when the braking-driving force is negative and the vehicle is stopped; and
   a second adjustment processing unit configured to start a second adjustment process of instructing at least one of the brake device and the drive device to increase the braking-driving force at a speed lower than an increasing speed of the braking-driving force before end of the first adjustment process on condition that the braking-driving force has become greater than or equal to a determination braking-driving force smaller than zero due to an increase in the braking-driving force accompanying the execution of the first adjustment process.

2. The vehicle control device according to claim 1, further comprising
   a start determination unit configured to determine whether the vehicle has started, wherein
   the second adjustment processing unit starts the second adjustment process on condition that the braking-driving force is greater than or equal to the determination braking-driving force and determination is made that the vehicle has started.

3. The vehicle control device according to claim 2, further comprising:
   a target attainment determination unit configured to determine whether one of the braking force and the driving force of the vehicle has reached a target value during execution of the second adjustment process; and
   a third adjustment processing unit configured to start a third adjustment process of instructing one of the brake device and the drive device to increase the braking-driving force on condition that determination is made that the one of the braking force and the driving force has reached the target value, wherein
   in the third adjustment process, the third adjustment processing unit instructs the one of the brake device and the drive device to increase the braking-driving force at the same speed as the increasing speed of the braking-driving force before end of the second adjustment process.

4. The vehicle control device according to claim 2, further comprising:
   a target attainment determination unit configured to determine whether one of the braking force and the driving force of the vehicle has reached a target value during execution of the second adjustment process; and
   a third adjustment processing unit configured to start a third adjustment process of instructing one of the brake device and the drive device to increase the braking-driving force on condition that determination is made that the one of the braking force and the driving force has reached the target value, wherein
   in the third adjustment process, the third adjustment processing unit instructs the one of the brake device and the drive device to increase the braking-driving force at a lower speed than the increasing speed of the braking-driving force before end of the second adjustment process.

5. The vehicle control device according to claim 1, further comprising:
   a target attainment determination unit configured to determine whether one of the braking force and the driving force of the vehicle has reached a target value during execution of the second adjustment process; and
   a third adjustment processing unit configured to start a third adjustment process of instructing one of the brake device and the drive device to increase the braking-driving force on condition that determination is made that the one of the braking force and the driving force has reached the target value, wherein
   in the third adjustment process, the third adjustment processing unit instructs the one of the brake device and the drive device to increase the braking-driving force at the same speed as the increasing speed of the braking-driving force before end of the second adjustment process.

6. The vehicle control device according to claim 1, further comprising:
a target attainment determination unit configured to determine whether one of the braking force and the driving force of the vehicle has reached a target value during execution of the second adjustment process; and
a third adjustment processing unit configured to start a third adjustment process of instructing one of the brake device and the drive device to increase the braking-driving force on condition that determination is made that the one of the braking force and the driving force has reached the target value, wherein
in the third adjustment process, the third adjustment processing unit instructs the one of the brake device and the drive device to increase the braking-driving force at a lower speed than the increasing speed of the braking-driving force before end of the second adjustment process.

7. A vehicle control device that starts a vehicle by controlling a brake device and a drive device; the vehicle control device comprising:
in a case where a force that becomes negative when a braking force of the vehicle exceeds a driving force of the vehicle and becomes positive when the braking force of the vehicle falls below the driving force of the vehicle is defined as a braking-driving force, a first adjustment processing unit configured to execute a first adjustment process of instructing at least one of the brake device and the drive device to increase the braking-driving force when the braking-driving force is negative and the vehicle is stopped; and
a second adjustment processing unit configured to start a second adjustment process of instructing at least one of the brake device and the drive device to increase the braking-driving force at a speed lower than an increasing speed of the braking-driving force before end of the first adjustment process by decreasing the increasing speed of the driving force without decreasing the decreasing speed of the braking force on condition that the braking-driving force has become greater than or equal to a determination braking-driving force smaller than zero due to an increase in the braking-driving force accompanying the execution of the first adjustment process.

8. The vehicle control device according to claim 7, further comprising
a start determination unit configured to determine whether the vehicle has started, wherein
the second adjustment processing unit starts the second adjustment process on condition that the braking-driving force is greater than or equal to the determination braking-driving force and determination is made that the vehicle has started.

9. The vehicle control device according to claim 8, further comprising:
a target attainment determination unit configured to determine whether one of the braking force and the driving force of the vehicle has reached a target value during execution of the second adjustment process; and
a third adjustment processing unit configured to start a third adjustment process of instructing one of the brake device and the drive device to increase the braking-driving force on condition that determination is made that the one of the braking force and the driving force has reached the target value, wherein
in the third adjustment process, the third adjustment processing unit instructs the one of the brake device and the drive device to increase the braking-driving force at the same speed as the increasing speed of the braking-driving force before end of the second adjustment process.

10. The vehicle control device according to claim 8, further comprising:
a target attainment determination unit configured to determine whether one of the braking force and the driving force of the vehicle has reached a target value during execution of the second adjustment process; and
a third adjustment processing unit configured to start a third adjustment process of instructing one of the brake device and the drive device to increase the braking-driving force on condition that determination is made that the one of the braking force and the driving force has reached the target value, wherein
in the third adjustment process, the third adjustment processing unit instructs the one of the brake device and the drive device to increase the braking-driving force at a lower speed than the increasing speed of the braking-driving force before end of the second adjustment process.

11. The vehicle control device according to claim 7, further comprising:
a target attainment determination unit configured to determine whether one of the braking force and the driving force of the vehicle has reached a target value during execution of the second adjustment process; and
a third adjustment processing unit configured to start a third adjustment process of instructing one of the brake device and the drive device to increase the braking-driving force on condition that determination is made that the one of the braking force and the driving force has reached the target value, wherein
in the third adjustment process, the third adjustment processing unit instructs the one of the brake device and the drive device to increase the braking-driving force at the same speed as the increasing speed of the braking-driving force before end of the second adjustment process.

12. The vehicle control device according to claim 7, further comprising:
a target attainment determination unit configured to determine whether one of the braking force and the driving force of the vehicle has reached a target value during execution of the second adjustment process; and
a third adjustment processing unit configured to start a third adjustment process of instructing one of the brake device and the drive device to increase the braking-driving force on condition that determination is made that the one of the braking force and the driving force has reached the target value, wherein
in the third adjustment process, the third adjustment processing unit instructs the one of the brake device and the drive device to increase the braking-driving force at a lower speed than the increasing speed of the braking-driving force before end of the second adjustment process.

* * * * *